(12) United States Patent
Olszta et al.

(10) Patent No.: US 10,510,375 B2
(45) Date of Patent: Dec. 17, 2019

(54) FRICTION ADJUSTMENT MECHANISMS FOR OPTIMIZING FRICTION BETWEEN A PAD AND A DISC IN AN OPTICAL DISC RESTORATION DEVICE

(71) Applicant: Venmill Industries Incorporated, Oxford, MA (US)

(72) Inventors: William Olszta, Webster, MA (US); Daniel St. Laurent, Webster, MA (US); Mariusz Surowaniec, Thompson, CT (US)

(73) Assignee: Venmill Industries Incorporated, Oxford, MA (US)

( * ) Notice: Subject to any disclaimer, the term of this patent is extended or adjusted under 35 U.S.C. 154(b) by 108 days.

(21) Appl. No.: 15/669,149

(22) Filed: Aug. 4, 2017

(65) Prior Publication Data

US 2017/0337947 A1 Nov. 23, 2017

Related U.S. Application Data

(60) Division of application No. 14/640,321, filed on Mar. 6, 2015, now Pat. No. 9,754,622, which is a
(Continued)

(51) Int. Cl.
| | |
|---|---|
| *G11B 23/50* | (2006.01) |
| *B24B 47/22* | (2006.01) |
| *B24B 13/04* | (2006.01) |
| *B24B 7/04* | (2006.01) |
| *B24B 13/00* | (2006.01) |
| *B24B 7/24* | (2006.01) |

(52) U.S. Cl.
CPC .............. *G11B 23/505* (2013.01); *B24B 7/04* (2013.01); *B24B 7/241* (2013.01); *B24B 13/00* (2013.01); *B24B 13/04* (2013.01); *B24B 47/22* (2013.01)

(58) Field of Classification Search
CPC .. B24B 7/04; B24B 7/24; B24B 7/241; B24B 13/00; B24B 13/04; B24B 37/10; B24B 41/047; B24B 41/053; B24B 47/22; G11B 23/505; G11B 23/507
See application file for complete search history.

(56) References Cited

U.S. PATENT DOCUMENTS

| | | | |
|---|---|---|---|
| 4,246,727 A | 1/1981 | Weissman | |
| 4,478,009 A * | 10/1984 | Rukavina | ............... B23Q 15/12 |
| | | | 318/39 |

(Continued)

FOREIGN PATENT DOCUMENTS

| | | |
|---|---|---|
| EP | 2236245 | 10/2010 |
| JP | 2000153450 | 6/2000 |
| JP | 2007189196 | 7/2007 |

*Primary Examiner* — Timothy V Eley
(74) *Attorney, Agent, or Firm* — Grossman Tucker Perreault & Pfleger PLLC

(57) ABSTRACT

The invention pertains in general to a latching mechanism for maintaining desired friction levels on an optical disc in an optical disc restoration device. In particular the invention pertains to devices, systems and methods for easily maintaining friction levels between pads and an optical disc in an optical disc restoration device for ease of adjusting friction settings during quality control, repair operation or when optimization settings are being set in an optical disc restoration device by a user.

11 Claims, 4 Drawing Sheets

Related U.S. Application Data continuation-in-part of application No. 14/401,967, filed on Nov. 18, 2014, now Pat. No. 9,620,166.

(60) Provisional application No. 61/949,305, filed on Mar. 7, 2014, provisional application No. 61/648,675, filed on May 18, 2012.

(56) References Cited

U.S. PATENT DOCUMENTS

| | | | |
|---|---|---|---|
| 4,783,870 A * | 11/1988 | Yeung | G11B 23/505 15/97.1 |
| 5,035,087 A * | 7/1991 | Nishiguchi | B24B 7/16 451/11 |
| 5,860,181 A | 1/1999 | Maekawa et al. | |
| 5,954,566 A | 9/1999 | Bauer | |
| 6,099,393 A | 8/2000 | Katagiri et al. | |
| 6,261,159 B1 | 7/2001 | Krieg et al. | |
| 6,386,946 B1 | 5/2002 | Lin et al. | |
| 6,595,835 B2 | 7/2003 | Gadbois | |
| 6,752,694 B2 * | 6/2004 | Schneegans | B24B 7/228 451/288 |
| 6,802,760 B1 | 10/2004 | Goldstein | |
| 6,846,228 B2 * | 1/2005 | Lin | B24B 27/0076 451/263 |
| 6,869,344 B2 | 3/2005 | Miyahara et al. | |
| 7,014,543 B1 | 3/2006 | Holbrook et al. | |
| 7,104,871 B1 * | 9/2006 | Kennedy | B24B 37/04 451/287 |
| 7,625,263 B2 | 12/2009 | Miyahara et al. | |
| 7,645,184 B2 * | 1/2010 | Saghian | B24B 29/04 451/359 |
| 3,045,440 A1 | 10/2011 | Miyahara et al. | |
| 8,342,905 B2 * | 1/2013 | Miyahara | B24B 37/015 451/2 |
| 8,366,516 B2 * | 2/2013 | Lin | B24B 7/04 451/287 |
| 2006/0166610 A1 | 7/2006 | Miyahara et al. | |
| 2008/0212440 A1 | 9/2008 | Verschuren | |
| 2009/0170404 A1 | 7/2009 | Sando | |
| 2011/0143636 A1 | 6/2011 | Miyahara | |
| 2013/0181465 A1 * | 7/2013 | Miyahara | G11B 23/505 294/90 |

\* cited by examiner

FRICTION ADJUSTMENT MECHANISMS FOR OPTIMIZING FRICTION BETWEEN A PAD AND A DISC IN AN OPTICAL DISC RESTORATION DEVICE

CROSS REFERENCE TO RELATED APPLICATION

This application is a divisional of co-pending U.S. patent application Ser. No. 14/640,321, entitled "Friction Adjustment Mechanisms for Optimizing Friction Between a Pad and a Disc in an Optical Disc Restoration Device, and Systems and Methods Thereof" filed Mar. 6, 2015, which itself claims benefit of U.S. Provisional Application Ser. No. 61/949,305, entitled, "Latching Mechanisms for Optimizing Frictions Levels in an Optical Restoration Device, and Systems and Methods Thereof" filed Mar. 7, 2014 and is a continuation-in-part of U.S. application Ser. No. 14/401,967, entitled "Devices, Methods and Systems for Restoring Optical Discs" filed Nov. 18, 2014, which claims benefit of U.S. Provisional Application Ser. No. 61/648,675, entitled "Devices, Methods and Systems for Restoring Optical Discs" filed May 18, 2012, the entire disclosures of which are incorporated herein by reference.

FIELD OF THE INVENTION

The invention pertains in general to devices, systems and methods for maintaining optimized friction levels on an optical disc in an optical disc restoration device for maximizing disc repair. In particular the invention pertains to a friction adjustment mechanisms for setting friction levels between pads in an optical disc restoration device and an optical disc on an optical disc platen, by providing a friction adjustment mechanism that can simply be accessed by a provider in a quality control measure, a repair operator, or a user, resulting in ease of quality control and repair procedures without requiring disassembly of a device, and resulting in optimized pressure from the pads onto an optical disc and improved disc repair.

BACKGROUND OF THE INVENTION

An optical disc restoration device is adapted for restoring, repairing and for polishing the surface of optical discs, namely compact discs (CD's), digital versatile discs (DVD's) and Blu-ray discs. A conventional optical disc restoration device generally comprises a housing, a motor mounted in the housing, an operation platen mounted in the housing and adapted for holding an optical disc, and pads or buffers, and rotatable by the motor to restore, repair or polish an optical disc. A top lid may house the pads or buffers, such that when the lid is in a closed position, the pads or buffers contact the optical disc in a restoration cycle.

Optical disc restoration devices are typically used to restore multiple optical discs within a short time frame. Wear and tear on an optical disc restoration device from multiple uses often effects the restoration capability of the device, including but not limited to wear and tear on the pads, depletion and clogging of restoration polishing agents, and improper alignment, movement of the pads and pressure of the pads on the optical disc from overall structural stress. The inventors seek to address restoration issues that arise in the pressure, the friction levels and the shifting of the pads on an optical disc during a restoration cycle, which may be altered as the motor spins and the overall structure of the device is under stress, thereby resulting in reduced restoration, repair and polishing power of the pads on an optical disc.

Presently, to optimize friction levels between pads and an optical disc in an optical disc restoration device requires significant quality control measures for fine tuning pressure, friction levels and for optimizing electric current in new devices, and complex disassembly of devices to repair and diagnose malfunctioning devices, including significant readjustment of parts throughout a device, readjustment of pads, the platen holding an optical disc, the motor and its controls. Other inventions that have been developed have used springs behind the pads and particular pad materials to maintain deformation levels of the pad, none of which result in easy to manage friction adjustment mechanisms as is apparent with the present invention.

The inventors have thus developed a friction adjustment mechanism that provides an adjustment screw easily rotatable by a provider in a quality control measure, a repair operator, or any user wherein adjusting the screw in one direction increases the friction between the pads and the optical disc, and wherein adjusting the screw in another direction decreases the friction between the pads and the optical disc, such that a provider, repair operator or other user can easily rotate to set and reset friction levels of pads on an optical disc in an optical disc restoration device, at any time. The invention effectively simplifies quality control procedures, repair procedures for distributors, manufacturers and other users alike, and provides easy to use devices and methods thereof for providing optimized optical disc restoration.

SUMMARY OF THE INVENTION

Embodiments of the present invention provide devices, systems and methods for optimizing friction levels between pads and an optical disc during an optical disc restoration cycle in an optical disc restoration device, for optimizing restoration, repair and polishing of an optical disc including but not limited to compact discs (CD's), digital versatile discs (DVD's), and Blu-ray discs. In this regard, one embodiment of the present invention may be summarized by the following features, including but not limited to, an optical disc restoration device with an optimized friction adjustment mechanism, including: a platen for holding an optical disc; a pad for polishing an optical disc; and an adjustment screw, wherein rotation of the adjustment screw in one direction results in a larger distance between the pads and the optical disc and thereby a lower friction between the pads and the optical disc and wherein rotation of the adjustment screw in another direction results in a closer distance between the pads and the optical disc and thereby a higher friction between the pads and the optical disc.

The present embodiment may further include a lock nut for locking a friction adjustment mechanism in place when a desired friction level is obtained.

The present embodiment may also include a top lid for holding the pads, an adjustable slide bracket and a latch hook for holding the top lid in a closed position once a desired or optimized friction level is determined and set. The present embodiment may further include a display with a measure of friction levels between one or more pads and an optical disc, such that a user can easily determine when an optimized friction level has been achieved, through for instance visual or audible cues.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims. It should be noted that the language used in the specification has been principally selected for readability and instructional purposes, and may not have been selected to delineate or circumscribe the inventive subject matter.

DEFINITIONS

Friction level: is the force resisting the relative motion of solid surfaces, fluid layers, and material elements sliding against each other.
Electric current: is a flow of force or electric charge when matter is close to other electrically charged matter.
Ampere: is the flow of electric charges through a surface at the rate of one coulomb per second and is the international system of units for measuring an electric current.
Ammeter: a measuring instrument for measuring electric current.
Platen: a flat or mostly flat plate, especially one that is capable of receiving pressure.

BRIEF DESCRIPTION OF THE FIGURES

Many aspects of the invention can be better understood with reference to the following drawings. The components in the drawings are not necessarily to scale, emphasis instead being placed upon clearly illustrating the principles of the present invention.

DETAILED DESCRIPTION OF THE INVENTION

The invention provides devices, systems and methods for optimizing and maintaining optimized friction settings in an optical disc restoration device. In particular the invention pertains to optical disc restoration devices with a specialized friction adjustment mechanism for optimizing and managing friction between the pads and an optical disc during a restoration cycle, for optimized disc restoration.

In accordance with one embodiment of the present invention, an optical disc restoration device with a friction adjustment mechanism, is described, including but not limited to: a platen for holding an optical disc; at least one pad for polishing an optical disc; and an adjustment screw, wherein rotation of the adjustment screw in one direction results in a larger distance between the pads and the optical disc and thereby a lower friction between the pad and the optical disc during a restoration cycle and wherein rotation of the adjustment screw in another direction results in a closer distance between the pads and the optical disc and thereby a higher friction between the pads and the optical disc during a restoration cycle. In accordance with this embodiment, the adjustment screw provides a device and method that maintains the correct pressure of the pads on the optical disc despite wear and tear on the device from repetitive use, which may otherwise alter the alignment, or pressure of the pads on the optical disc. The present embodiment provides for ease of quality control measures and repair of an optical disc restoration device by a provider, repair operator or a user. For instance when a device has been sent back to a provider for repair or is sent to a repair service, the present invention allows the provider or repair operator to easily adjust and reset friction settings between the pads and the optical disc without requiring complex disassembly of the device. The present invention may further be provided with instructions such that an end-user can easily adjust and optimize friction levels between one or more pads and an optical disc in an optical disc restoration device.

Figure 1:
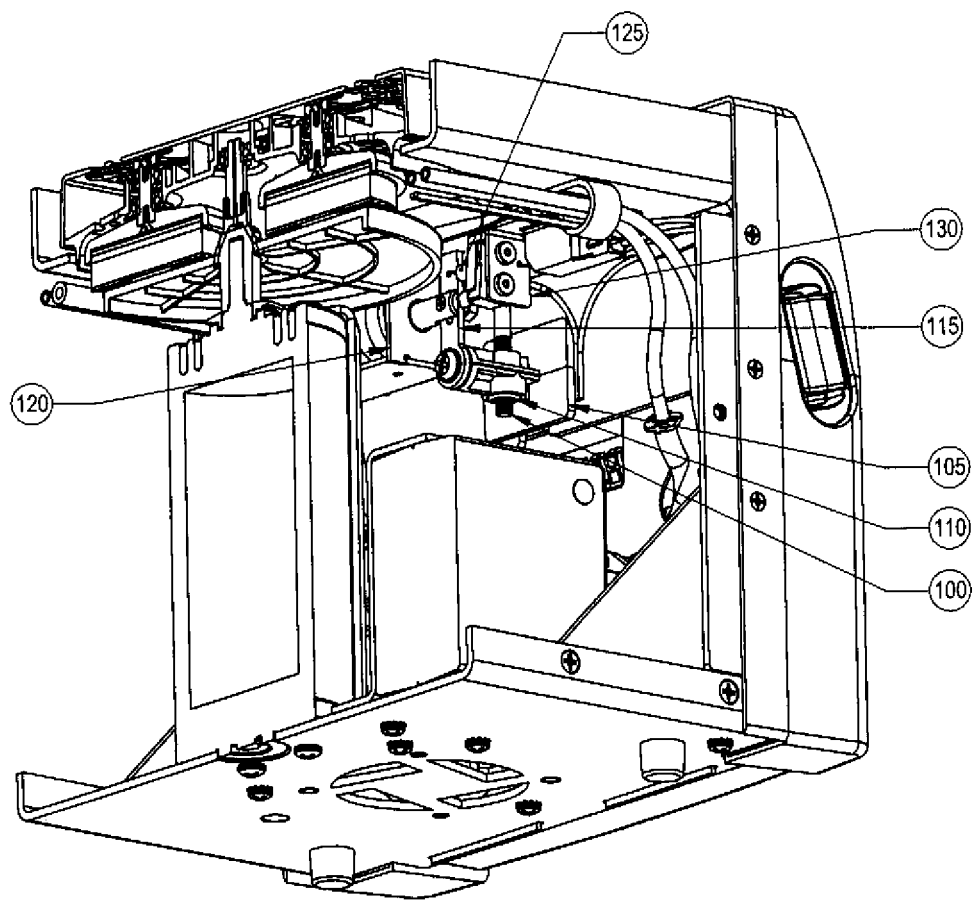
FIG. 1 shows a perspective view of an optical disc restoration device with the side panels of the device removed to show the features of a friction adjustment mechanism in accordance with one embodiment of the present invention.

In order to provide an adjustment screw that can simply be accessed, the inventors developed a structural modification to optical disc restoration devices to embody an adjustment screw that could easily be accessed, and functionally affect the friction of the pads on the optical disc when the adjustment screw is turned in either direction. FIG. 1 shows a perspective view of an optical disc repair device with the sides and back panel removed for showing the internal structural modifications developed by the inventors to provide an adjustment screw in accordance with the present embodiment. In this embodiment the adjustment screw, 100, is shown attached to the adjustable slide bracket, 105, which is further attached to a lock nut 110, for allowing a user to rotate the adjustment screw, 100, and lock a desired friction level in an optical disc restoration device. A hook, 115, is further shown attached to the adjustable slide bracket 105 such that the pads on a top lid will respond to the friction setting locked in place by the adjustment screw, 100, and the lock nut, 110. In accordance with this embodiment, the hook 115 holds the top lid of the optical disc restoration device in a closed position. The hook 115 in this embodiment provides for the physical connection of the pads to the optical disc at the optimized friction settings secured by the adjustable screw 100. Yet further in this embodiment, the pull solenoid 120, the return spring 125, and the spring bracket 130 are further shown. In accordance with this embodiment the pull solenoid 120 unlatches the hook 115 from the top lid, allowing the device to open and the return spring 125 pulls the hook 115 from the position that the pull solenoid had moved the hook 115 to when unlatching the top lid. In accordance with this embodiment, turning of the adjustment screw causes the adjustable slide bracket to slide, thereby also moving the lock nut into a desired position. When the electric current in this embodiment is at 3 ampere, as measured by an ammeter during a quality control test, a repair, or in an automated manner for an end-user, the friction settings are at optimized levels and the lock nut 110 will prevent the adjustment screw 100 from rotating, thereby securing the desired friction level. In accordance with this embodiment, the optimized friction level settings of current, friction, pressure and distance of the pads to an optical disc may be easily set by simply adjusting the screw 100. In yet other embodiments a lead screw, gear train, rack and pinions gear systems, cam action and other motorized systems may be used in addition to visual or audible cues to indicate optimized friction settings between the pads and an optical disc.

In accordance with the present embodiment, the return spring may be between the hook 115 and the spring bracket and allows for the adjustment mechanism in accordance with the present embodiment to restart between restoration cycles by maintaining tension on the hook 115. In accordance with this embodiment the spring bracket holds switches that run the optical disc restoration cycle operations, and also holds the other end of the return spring so that the return spring can hold the hook 115 in a desired location.

The hook 115 in accordance with the present embodiment may be placed in the middle, front, back or center of the optical disc restoration device in order to hold the pads and the optical disc in an even or balanced manner for optimizing friction levels between the pads and the optical disc. In accordance with this embodiment, the adjustable slide bracket stabilizes, holds, pivots, and adjusts the hook 115.

In yet another embodiment of the present invention, a method for adjusting friction levels in an optical disc restoration device, is described, including but not limited to the steps of: providing an optical disc restoration device; and, providing an adjustable screw, wherein rotation of the adjustable screw in one direction results in higher friction between one or more pads and an optical disc during a restoration cycle and wherein rotation of said adjustable screw in another direction results in lower friction between said one or more pads and said optical disc during a restoration cycle. The present embodiment may further include the step of providing an automated friction level notification when the adjustable screw is rotated. The present embodiment may yet further include the step of providing a latch hook for holding a top lid with the pads onto a disc on a platen, and maintaining physical contact of the pad to the disc at the desired friction levels in accordance with the present invention. The present embodiment may also include the step of providing a water supply means for optimized restoration procedures, an abrasive or polishing solution supply means for optimized restoration procedures, fan blades and one or more exhaust ports in the top lid of the optical disc restoration device to help control heat and vapor levels resulting from friction during an optical disc restoration cycle.

Figure 2:
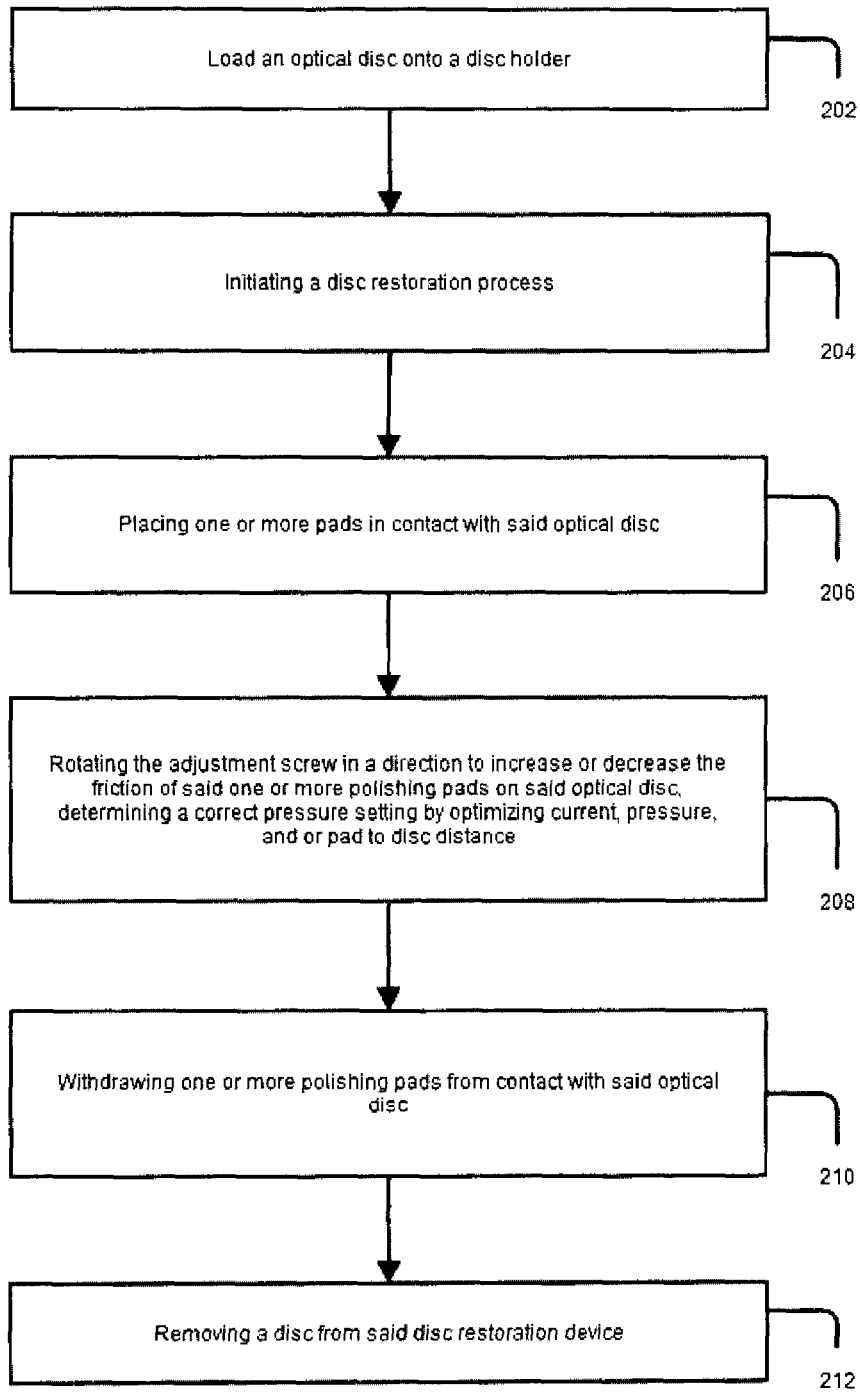
FIG. 2 shows a flowchart of steps to optimize friction settings using the friction adjustment mechanism in accordance with one embodiment of the present invention.

In accordance with another embodiment, as shown in FIG. 2, the following steps may be conveniently used to optimize friction between pads and an optical disc during a repair, quality control or by a user after several successive uses of the device, in accordance with the present invention: 1) load an optical disc onto a disc holder, step 202 2) initiating a disc restoration process, step 204 3) placing one or more pads in contact with said optical disc, step 206 4) rotating the adjustment screw in a direction to increase or decrease the friction of said one or more polishing pads on said optical disc, determining a correct pressure setting by optimizing current, pressure, and or pad to disc distance, step 208 5) withdrawing one or more polishing pads from contact with said optical disc, step 210 6) removing a disc from said disc restoration device, step 212. In accordance with this embodiment, the restoration cycle can be repeated in the same order of steps listed above to ensure the pressure and thereby friction of the pads on the optical disc during a restoration cycle is optimized to accommodate for wear and tear of the optical disc restoration device from repetitive or successive uses. Further in accordance with the embodiment described herein, the step of withdrawing the one or more polishing pads from contact with the optical disc, step 210, may be manually accomplished by lifting or pulling a handle or like structure to withdraw a top lid housing the one or more polishing pads, or automatically accomplished with an automated lid withdrawing mechanism.

In yet another embodiment of the present invention, a method for optimizing friction between one or more pads and an optical disc in an optical disc restoration device, is described, including but not limited to the steps of providing a platen for holding an optical disc, wherein the platen is attached to a motor; providing one or more rotatable pads, wherein the pads are in contact with the optical disc during a restoration cycle, and, providing a friction adjustment mechanism, wherein rotation of the friction adjustment mechanism results in higher and lower friction settings between the rotatable pads and the optical disc during an optical disc restoration cycle. This embodiment may further include the step of providing an adjustment screw as a friction adjustment mechanism, wherein rotation of the adjustment screw in one direction result in a higher friction setting and rotation of the screw in another direction results in a lower friction setting between the pads and the optical disc, such that quality control operators, a repair operator or a user may maintain friction levels between one or more.

In addition to having an adjustment screw, other means for adjusting friction levels in an optical disc restoration device may be used, including but not limited to: a motor driven lead screw; a rack and pinion movement such as a rotational to linear gearing mechanism, a cam movement system, a pneumatic system, a hydraulic system, a belt driven system, a spring loaded system, a pulley system, a gearing system, and any combination of thereof.

Figure 3:
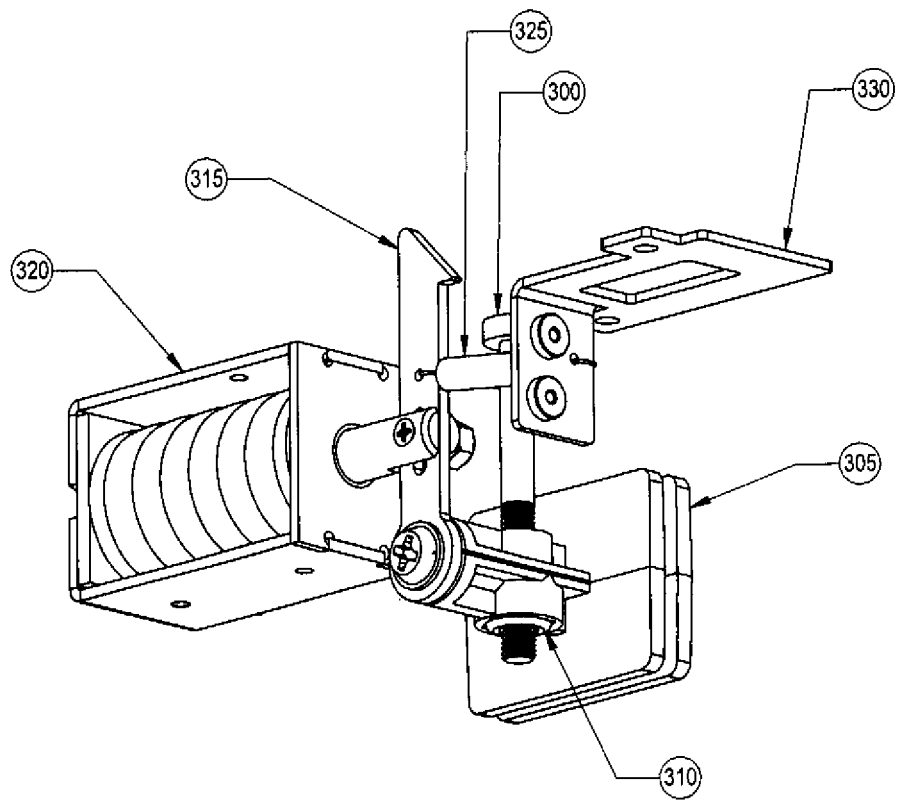
FIG. 3 shows a perspective view of an optical disc restoration device with a friction adjustment mechanism in accordance with one embodiment of the present invention.

FIG. 3 shows one embodiment of a latching mechanism in accordance with one embodiment of the present invention. In this embodiment the adjustment screw, 300, is shown attached to the adjustable slide bracket, 305, which is further attached to the lock nut 310, for allowing a user to rotate the adjustment screw, 300, and lock a desired friction level in an optical disc restoration device. Hook, 315, is further shown attached to the adjustable slide bracket 305 such that the pads on a top lid will respond to the friction setting locked in place by the adjustment screw, 300, and the lock nut, 310. Yet further in this embodiment, the pull solenoid 320, the return spring 325, and the spring bracket 330 are further shown. In accordance with this embodiment the pull solenoid 320 unlatches the latch hook from the top lid, allowing the device to open and the return spring 325 pulls the latch hook from the position that the pull solenoid had moved the latch hook to when unlatching the top lid.

In addition in this embodiment the spring bracket 330 is a stationary plate which allows for the spring to apply tension on the latch hook to pull the latch hook from the position that the pull solenoid had moved the latch hook to when unlatching the top lid.

Figure 4:
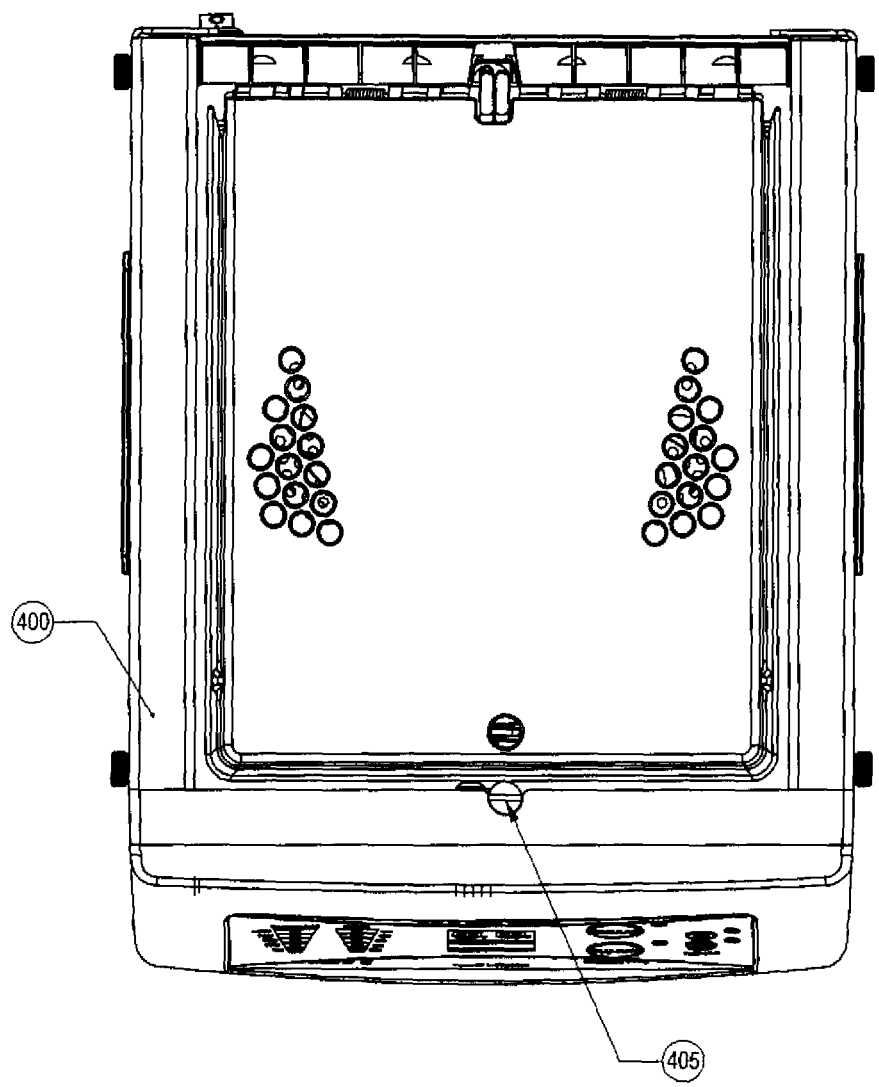
FIG. 4 shows a top view of an optical disc restoration device with a friction adjustment mechanism in accordance with one embodiment of the present invention.

FIG. 4 shows yet another embodiment of the present invention showing an adjustable screw 405 in an optical disc restoration device 400. In accordance with the figure shown it is apparent that a user can easily turn the adjustable screw to set preferred friction levels in the optical disc restoration device, which is easily measured with an ammeter in electric current measurements. The adjustable screw allows simple methods for finalizing device friction requirements in quality control procedures, and for user's, store owners, distributors and the like to reset preferred friction levels for optimized optical disc restoration.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An optical disc restoration device with a friction adjustment mechanism, comprising:
    a platen for holding an optical disc;
    at least one pad for polishing an optical disc;
    an adjustment screw rotatable in a first direction and a second direction; and
    an adjustable slide bracket coupled to the adjustment screw; and wherein:
    rotation of said adjustment screw in the first direction results in decreased friction between the at least one pad and said optical disc during a restoration cycle;
    rotation of said adjustment screw in a second direction results in increased friction between the at least one pad and said optical disc during a restoration cycle; and
    rotation of said adjustment screw causes said adjustable slide bracket to slide.

2. The optical disc restoration device in accordance with claim 1, further including a lock nut, wherein said lock nut holds said adjustment screw at a desired position.

3. The optical disc restoration device in accordance with claim 2 further including a top lid that is movable between an open and a closed position.

4. The optical disc restoration device in accordance with claim 3 further comprising a hook, wherein said hook is configured to hold said top lid when said top lid is in the closed position.

5. The optical disc restoration device in accordance with claim 4 further comprising a return spring, wherein said return spring pulls said hook when said top lid is in the open position.

6. The optical disc restoration device in accordance with claim 5, further comprising a spring bracket, wherein said spring bracket applies tension to said hook when said top lid is in an open position.

7. The optical disc restoration device in accordance with claim 3, further comprising one or more fan blades, wherein said one or more fan blades reside in said top lid opposite said one or more pads.

8. The optical disc restoration device in accordance with claim 2, wherein rotation of said adjustable screw further causes said lock nut to move.

9. The optical disc restoration device in accordance with claim 2, further comprising one or more exhaust ports in said top lid, wherein said one or more exhaust ports remove vapor and heat from said optical disc restoration device.

10. The optical disc restoration device in accordance with claim 1, further comprising a water supply means.

11. The optical disc restoration device in accordance with claim 10, further comprising an abrasive solution supply means.

* * * * *